United States Patent
Xu et al.

(10) Patent No.: US 11,871,005 B2
(45) Date of Patent: *Jan. 9, 2024

(54) METHODS AND APPARATUS FOR INTRA CODING A BLOCK HAVING PIXELS ASSIGNED TO GROUPS

(71) Applicant: INTERDIGITAL VC HOLDINGS, INC., Wilmington, DE (US)

(72) Inventors: Qian Xu, Folsom, CA (US); Joel Sole, San Diego, CA (US); Peng Yin, Ithaca, NY (US); Yunfei Zheng, San Jose, CA (US); Xiaoan Lu, Princeton, NJ (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,423

(22) Filed: Nov. 15, 2021

(65) Prior Publication Data
US 2022/0078448 A1    Mar. 10, 2022

Related U.S. Application Data

(63) Continuation of application No. 17/022,757, filed on Sep. 16, 2020, now Pat. No. 11,212,534, which is a
(Continued)

(51) Int. Cl.
*H04N 19/157* (2014.01)
*H04N 19/105* (2014.01)
(Continued)

(52) U.S. Cl.
CPC ......... *H04N 19/157* (2014.11); *H04N 19/105* (2014.11); *H04N 19/12* (2014.11);
(Continued)

(58) Field of Classification Search
CPC ... H04N 19/119; H04N 19/102; H04N 19/159
See application file for complete search history.

(56) References Cited

U.S. PATENT DOCUMENTS

2005/0008232 A1    1/2005   Shen et al.
2005/0190977 A1    9/2005   Jeon et al.
(Continued)

FOREIGN PATENT DOCUMENTS

EP    1720358    11/2006
EP    1761063     3/2007
(Continued)

OTHER PUBLICATIONS

Chang et al., "Direction-Adaptive Partitioned Block Transform for Image Coding", Image Processing, 2008, ICIP 2008, 15th IEEE Interntional Conference, Oct. 12-15, 2008, pp. 145-148.
(Continued)

*Primary Examiner* — Jared Walker
(74) *Attorney, Agent, or Firm* — Ronald Kolczynski

(57) ABSTRACT

Methods and apparatus are provided for intra coding a block having pixels assigned to groups. An apparatus includes a video encoder for encoding a block in a picture using intra prediction by dividing pixels within the block into at least a first group and a second group and encoding the pixels in the first group prior to encoding the pixels in the second group. A prediction for at least one of the pixels within the second group is obtained by evaluating the pixels within the first group and the second group.

16 Claims, 10 Drawing Sheets

Related U.S. Application Data continuation of application No. 16/106,125, filed on Aug. 21, 2018, now Pat. No. 10,805,610, which is a continuation of application No. 13/697,562, filed as application No. PCT/US2011/000856 on May 13, 2011, now Pat. No. 10,080,024.

(60) Provisional application No. 61/334,935, filed on May 14, 2010.

(51) Int. Cl.
| | |
|---|---|
| *H04N 19/176* | (2014.01) |
| *H04N 19/147* | (2014.01) |
| *H04N 19/46* | (2014.01) |
| *H04N 19/134* | (2014.01) |
| *H04N 19/61* | (2014.01) |
| *H04N 19/593* | (2014.01) |
| *H04N 19/12* | (2014.01) |
| *H04N 19/132* | (2014.01) |

(52) U.S. Cl.
CPC ......... *H04N 19/132* (2014.11); *H04N 19/134* (2014.11); *H04N 19/147* (2014.11); *H04N 19/176* (2014.11); *H04N 19/46* (2014.11); *H04N 19/593* (2014.11); *H04N 19/61* (2014.11)

(56) References Cited

U.S. PATENT DOCUMENTS

| | | | |
|---|---|---|---|
| 2007/0053433 | A1 | 3/2007 | Song |
| 2007/0058715 | A1 | 3/2007 | Kim et al. |
| 2007/0230567 | A1* | 10/2007 | Wang ............. H04N 19/29 375/E7.199 |
| 2008/0304569 | A1 | 12/2008 | Lee |
| 2009/0046781 | A1 | 2/2009 | Moriya et al. |
| 2009/0110069 | A1 | 4/2009 | Jung et al. |
| 2009/0225829 | A2 | 9/2009 | Kwon et al. |
| 2009/0232211 | A1 | 9/2009 | Chen et al. |
| 2011/0249731 | A1 | 10/2011 | Zhao et al. |

FOREIGN PATENT DOCUMENTS

| | | |
|---|---|---|
| EP | 1976298 | 10/2008 |
| EP | 2059048 | 5/2009 |
| JP | 2007074725 | 3/2007 |
| JP | 2007282014 | 10/2007 |
| JP | 2009528762 | 8/2009 |
| KR | 20100037180 | 4/2010 |
| RU | 2355126 | 11/2007 |
| RU | 2342803 | 12/2008 |
| WO | WO2008120577 | 10/2008 |
| WO | WO2009136066 | 11/2009 |
| WO | WO2010050106 | 5/2010 |
| WO | WO2010086548 | 8/2010 |

OTHER PUBLICATIONS

Dai et al., "Geometry-Adaptive Block Partitioning for Intra Prediction in Image & Video Coding", Image Processing, 2007, ICIP 2007, IEEE International Conference, vol. 6, Sep. 16, 2007-Oct. 19, 2007, pp. VI-85-VI-88.

Escoda et al., "Geometry-Adaptive Block Partitioning for Video Coding", Acoustics, Speech and Signal Processing, 2007, ICASSP 2007, IEEE International Conference, vol. 1, Apr. 15-20, 2007, pp. I-657-I-660.

International Telecommunication Union, "Advanced Video Coding for Generic Audiovisual Services", Series H: Audiovisual and Multimedia Systems Infrastructure of Audiovisual Services—Coding of Moving Video, H.264, Mar. 2005, 364 pages.

Ugur et al., "Description of Video Coding Technology Proposal by Tandberg, Nokia, Ericcson", JVT of ITU-T SG16 WP3 and ISO/IEC JTC1/SC29/WG11, Document JCTVC-A119, 1st Meeting: Fresden, DE, Apr. 15-23, 2010.

Gang et al., "The Intra Prediction Based on Sub Block," Int'l., Conference on Signal Processing, vol. 1, Aug. 31, 2004-Sep. 4, 2004, pp. 467-469.

Narroschke et al., "Adaptive Prediction Error Coding in Spatial and Frequency Domain for H.264/AVC," ITU Study Group 16—Video Coding Experts Group, ISO/IEC MPEG & ITU-T VCEG (ISO/IEC JTC1/SC29/WG11 and ITU-T SG16 Q6), Doc.: VCEG-AB06, Jan. 15, 2006, pp. 1-13.

Tan et al., "Intra-prediction with Adaptive Sub-sampling," 2nd JCT-VC Meeting, Geneva (Joint Collaborative Team on Video Coding of ISO/IEC JTC1/SC29/WG11 and ITU-T SG.16), Jul. 21-18, 2010, pp. 1-4.

Wiegand et al., "Overview of the H.264/AVC Video Coding Standard," IEEE Transactions on Circuits and Systems for Video Technology, vol. 13, No. 7, Jul. 1, 2003, pp. 560-576.

Tao et al., "Horizontal Spatial Prediction for High Dimension Intra Coding," IEEE Data Compression Conference (DCC), Mar. 24, 2010, one page—552.

Shiodera et al_"Block Based Extra/Inter-Porating Prediction for Intra Coding", 2007 IEEE International Conference on Image Processing IEEE, Sep. 16, 2007, vol. 6, pp. VI-445-VI-448.

Search report dated Mar. 7, 2012.

Zeng, et al., A Novel Fast Intra-Prediction Mode Selection Algorithm for H.264/AVC, Journal of Image and Graphics, vol. 12, No. 2, 2007, pp. 189-194.

* cited by examiner

FIG. 1
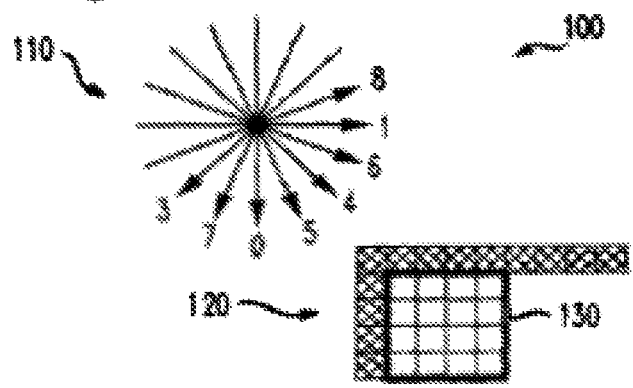
FIG. 2
| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |
FIG. 3A
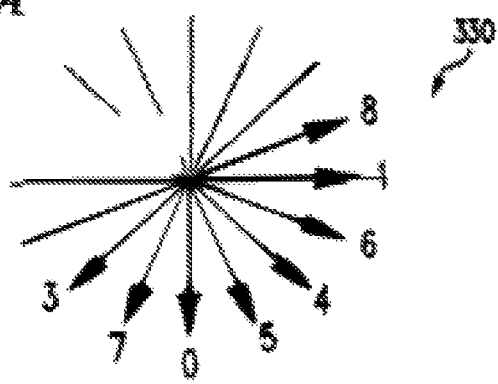

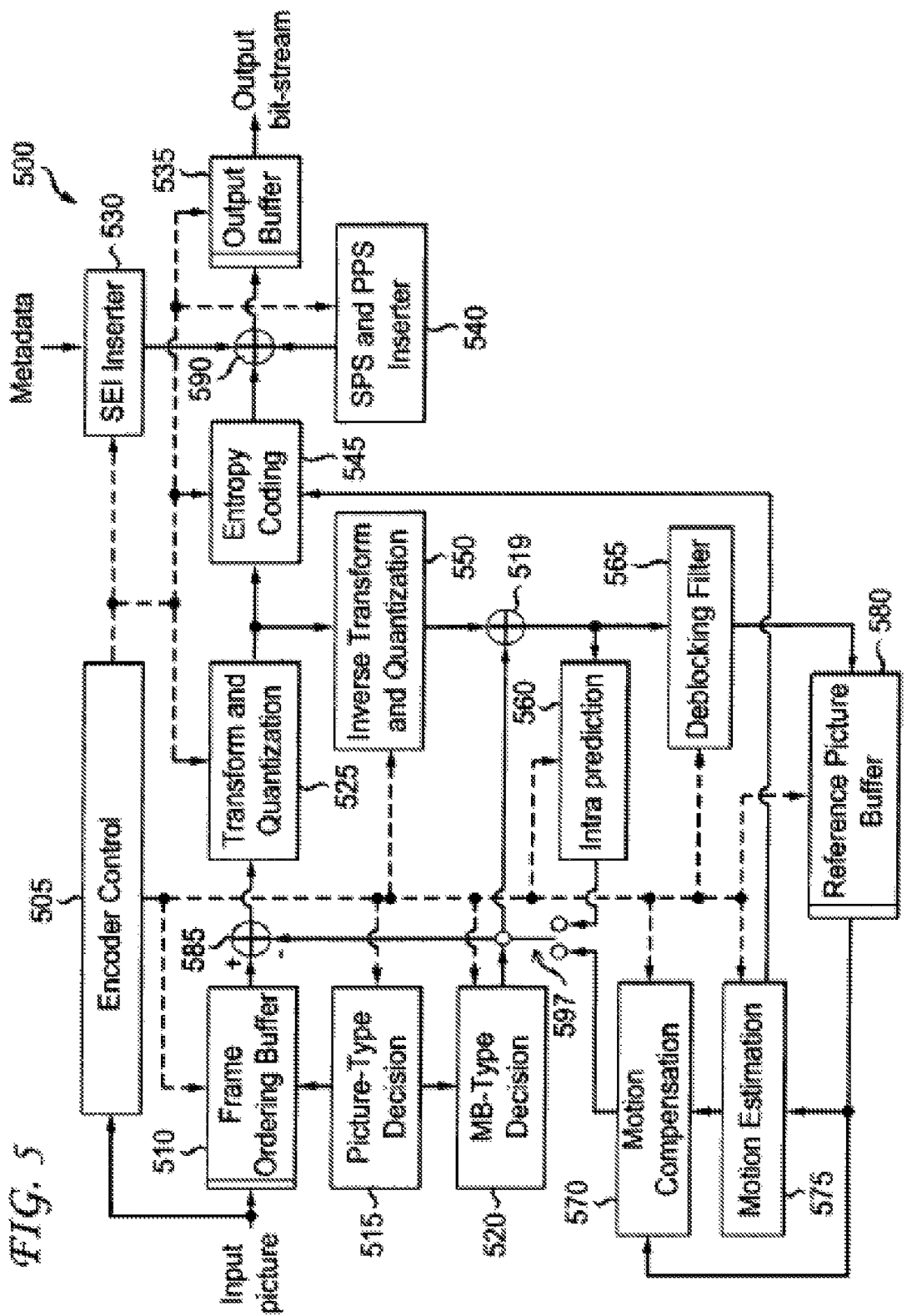

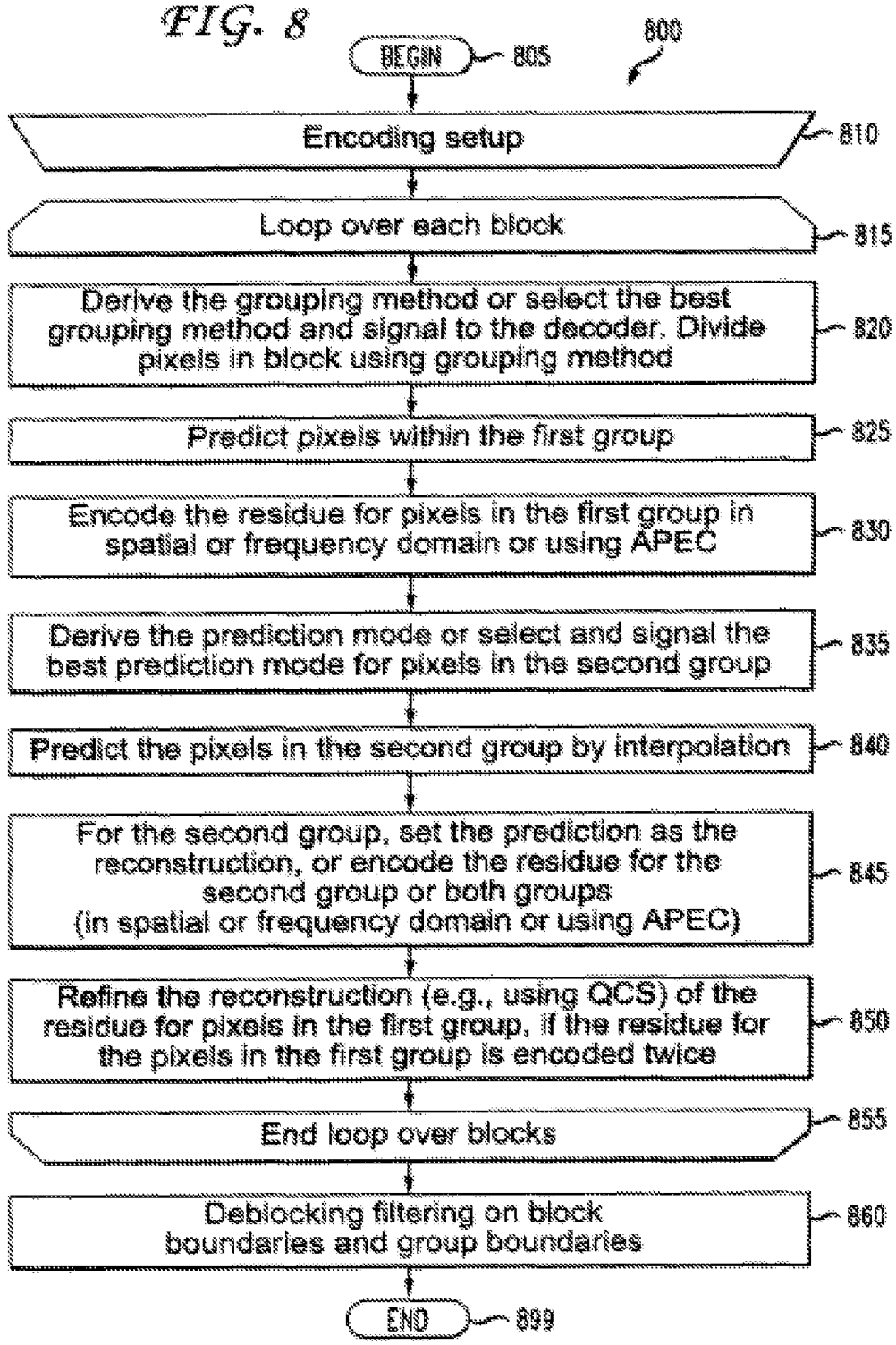

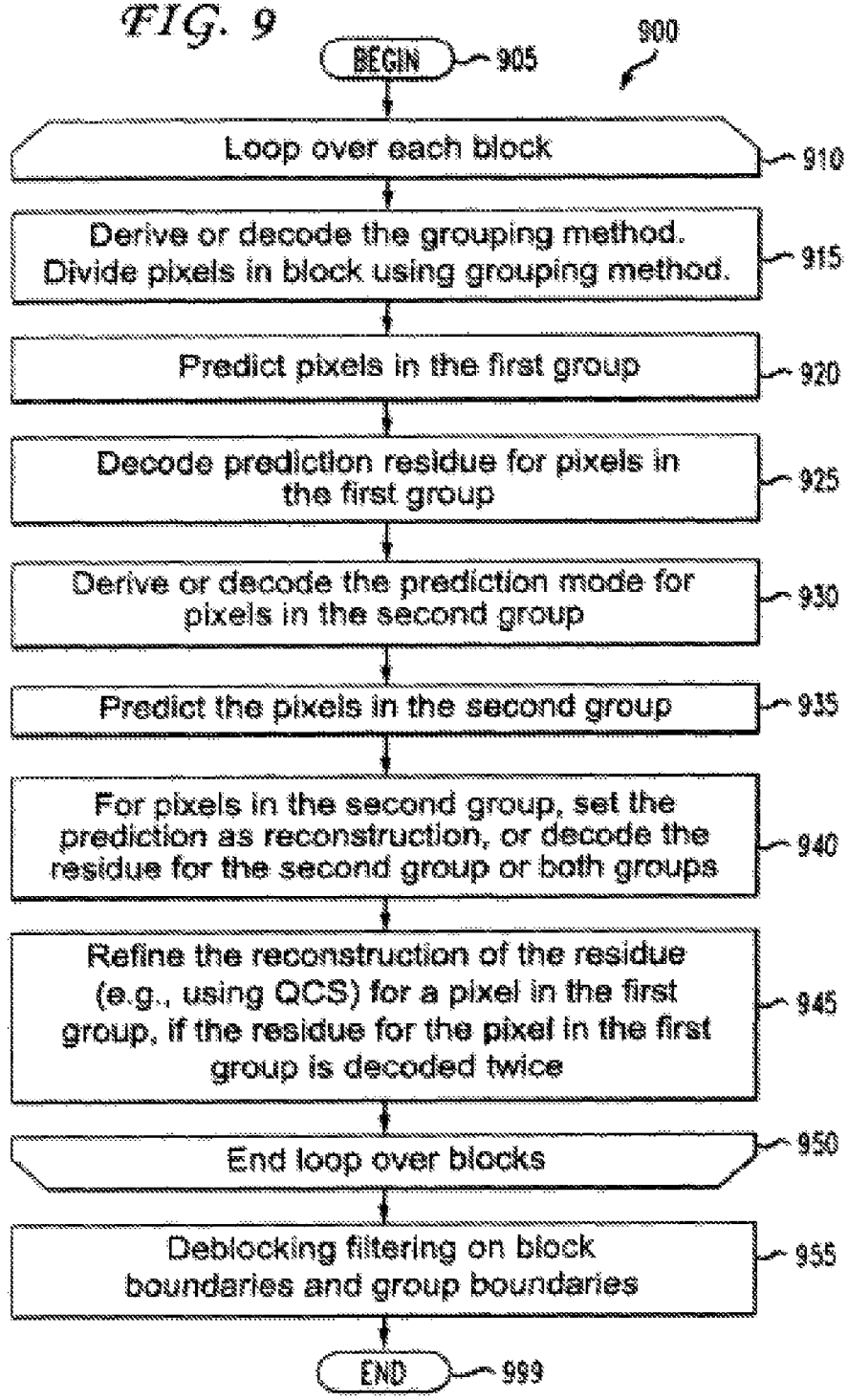

METHODS AND APPARATUS FOR INTRA CODING A BLOCK HAVING PIXELS ASSIGNED TO GROUPS

CROSS-REFERENCE TO RELATED APPLICATIONS

This application claims the benefit of U.S. Provisional Application Ser. No. 61/334,935, filed May 14, 2010, which is incorporated by reference herein in its entirety.

TECHNICAL FIELD

The present principles relate generally to video encoding and decoding and, more particularly, to methods and apparatus for intra coding a block having pixels assigned to groups.

BACKGROUND

Intra blocks make use of existing redundancy in spatial correlation to improve video coding efficiency. How to effectively utilize spatial correlation is fundamental to the efficiency of current video codecs for intra coding. It is observed that the correlation between pixels decreases with the spatial distance. In current state-of-the art coding standards such as, for example, the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), only the encoded pixels above or to the left of the current block are used as its predictors, which may be quite far from the bottom right pixels to be predicted. As a natural affect of redundancy likely existing due to spatial proximity, the prediction accuracy in such schemes is normally limited, and the prediction accuracy of the bottom right pixels may be limited. In addition, extrapolation is used instead of interpolation because of the limitation of causality.

MPEG-4 AVC Standard Intra Prediction

The MPEG-4 AVC Standard is the first video coding standard that employs spatial directional prediction for intra coding. The MPEG-4 AVC Standard provides a flexible prediction framework, thus the coding efficiency is greatly improved over previous standards where intra prediction was only performed in the transform domain. In the MPEG-4 AVC Standard, spatial intra prediction is performed using the surrounding available samples, which are the previously reconstructed samples available at the decoder within the same slice. For luma samples, intra prediction can be done on a 4×4 block basis (denoted as Intra_4×4), an 8×8 block basis (denoted as Intra_8×8) and on a 16×16 macroblock basis (denoted as Intra_16×16). Turning to FIG. 1, MPEG-4 AVC Standard directional intra prediction with respect to a 4×4 block basis (Intra_4×4) is indicated generally by the reference numeral 100. Prediction directions are generally indicated by the reference numeral 110, image blocks are generally indicated by the reference numeral 120, and a current block is indicated by the reference numeral 130. In addition to luma prediction, a separate chroma prediction is performed. There are a total of nine prediction modes for Intra_4×4 and Intra_8×8, four modes for Intra_16×16 and four modes for the chroma component. The encoder typically selects the prediction mode that minimizes the difference between the prediction and original block to be coded. A further intra coding mode, I_PCM, allows the encoder to simply bypass the prediction and transform coding processes. It allows the encoder to precisely represent the values of the samples and place an absolute limit on the number of bits that may be contained in a coded macroblock without constraining decoded image quality.

Turning to FIG. 2, labeling of prediction samples for the Intra_4×4 mode of the MPEG-4 AVC Standard is indicated generally by the reference numeral 200. FIG. 2 shows the samples (in capital letters A-M) above and to the left of the current blocks which have been previously coded and reconstructed and are therefore available at the encoder and decoder to form the prediction.

Turning to FIGS. 3B-J, Intra_4×4 luma prediction modes of the MPEG-4 AVC Standard are indicated generally by the reference numeral 300. The samples a, b, c, . . . , p of the prediction block are calculated based on the samples A-M using the Intra_4×4 luma prediction modes 300. The arrows in FIGS. 3B-J indicate the direction of prediction for each of the Intra_4×4 modes 300. The Intra_4×4 luma prediction modes 300 include modes 0-8, with mode 0 (FIG. 3B, indicated by reference numeral 310) corresponding to a vertical prediction mode, mode 1 (FIG. 3C, indicated by reference numeral 311) corresponding to a horizontal prediction mode, mode 2 (FIG. 3D, indicated by reference numeral 312) corresponding to a DC mode, mode 3 (FIG. 3E, indicated by reference numeral 313) corresponding to a diagonal down-left mode, mode 4 (FIG. 3F, indicated by reference numeral 314) corresponding to a diagonal down-right mode, mode 5 (FIG. 3G, indicated by reference numeral 315) corresponding to a vertical-right mode, mode 6 (FIG. 3H, indicated by reference numeral 316) corresponding to a horizontal-down mode, mode 7 (FIG. 3I, indicated by reference numeral 317) corresponding to a vertical-left mode, and mode 8 (FIG. 3J, indicated by reference numeral 318) corresponding to a horizontal-up mode. FIG. 3A shows the general prediction directions 330 corresponding to each of the Intra_4×4 modes 300.

In modes 3-8, the predicted samples are formed from a weighted average of the prediction samples A-M. Intra_8×8 uses basically the same concepts as the 4×4 predictions, but with a block size 8×8 and with low-pass filtering of the predictors to improve prediction performance.

Turning to FIGS. 4A-D, four Intra_16×16 modes corresponding to the MPEG-4 AVC Standard are indicated generally by the reference numeral 400. The four Intra_16×16 modes 400 includes modes 0-3, with mode 0 (FIG. 4A, indicated by reference numeral 411) corresponding to a vertical prediction mode, mode 1 (FIG. 4B, indicated by reference numeral 412) corresponding to a horizontal prediction mode, mode 2 (FIG. 4C, indicated by reference numeral 413) corresponding to a DC prediction mode, and mode 3 (FIG. 4D, indicated by reference numeral 414) corresponding to a plane prediction mode. Each 8×8 chroma component of an intra coded macroblock is predicted from previously encoded chroma samples above and/or to the left and both chroma components use the same prediction mode. The four prediction modes are very similar to the Intra_16×16, except that the numbering of the modes is different. The modes are DC (mode 0), horizontal (mode 1), vertical (mode 2) and plane (mode 3).

Although intra prediction in the MPEG-4 AVC Standard can exploit some spatial redundancy within a picture, the prediction only relies on pixels above or to the left of the block which have already been encoded. The spatial distance between the pixels serving as predictions (which we call predictor pixels) and the pixels being predicted (which we call predicted pixels), especially the ones on the bottom right of the current block, can be large. With a large spatial distance, the correlation between pixels can be low, and the residue signals can be large after prediction, which affects the coding efficiency. In addition, as noted above, extrapolation is used instead of interpolation because of the limitation of causality.

Planar prediction for Intra 16×16 In a first prior art approach, a new encoding method for the planar mode of intra 16×16 is proposed. When a macroblock is coded in planar mode, its bottom-right sample is signaled in the bitstream, the rightmost and bottom samples of the macroblock are linearly interpolated, and the middle samples are bi-linearly interpolated from the border samples. When planar mode is signaled, the same algorithm is applied to luminance and both chrominance components separately with individual signaling of the bottom-right samples (using a 16×16 based operation for luminance and an 8×8 based operation for chrominance). The planar mode does not code the residue.

Although the new planar prediction method exploits some spatial correlation with the bottom-right sample, the prediction accuracy of the right and bottom pixels are still quite limited.

SUMMARY

These and other drawbacks and disadvantages of the prior art are addressed by the present principles, which are directed to methods and apparatus for intra coding a block having pixels assigned to groups.

According to an aspect of the present principles, there is provided an apparatus. The apparatus includes a video encoder for encoding a block in a picture using intra prediction by dividing pixels within the block into at least a first group and a second group and encoding the pixels in the first group prior to encoding the pixels in the second group. A prediction for at least one of the pixels within the second group is obtained by evaluating the pixels within the first group and the second group.

According to another aspect of the present principles, there is provided a method in a video encoder. The method includes encoding a block in a picture using intra prediction by dividing pixels within the block into at least a first group and a second group and encoding the pixels in the first group prior to encoding the pixels in the second group. A prediction for at least one of the pixels within the second group is obtained by evaluating the pixels within the first group and the second group.

According to yet another aspect of the present principles, there is provided an apparatus. The apparatus includes a video decoder for decoding a block in a picture using intra prediction by dividing pixels within the block into at least a first group and a second group and decoding the pixels in the first group prior to decoding the pixels in the second group. A prediction for at least one of the pixels within the second group is obtained by evaluating the pixels within the first group and the second group.

According to still another aspect of the present principles, there is provided a method in a video decoder. The method includes decoding a block in a picture using intra prediction by dividing pixels within the block into at least a first group and a second group and decoding the pixels in the first group prior to decoding the pixels in the second group. A prediction for at least one of the pixels within the second group is obtained by evaluating the pixels within the first group and the second group.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 1 is a diagram showing MPEG-4 AVC Standard directional intra prediction with respect to a 4×4 block basis (Intra_4×4), FIG. 2 is a diagram showing labeling of prediction samples for the Intra_4×4 mode of the MPEG-4 AVC Standard;

FIGS. 3A-J are diagrams respectively showing Intra_4×4 luma prediction modes of the MPEG-4 AVC Standard;

FIG. 5 is a block diagram showing an exemplary video encoder to which the present principles may be applied, in accordance with an embodiment of the present principles;

FIG. 8 is a flow diagram showing an exemplary method for intra coding a block having pixels assigned to groups, in accordance with an embodiment of the present principles; and FIG. 9 is a flow diagram showing an exemplary method for intra decoding a block having pixels assigned to groups, in accordance with an embodiment of the present principles.

DETAILED DESCRIPTION

Figure 3B:
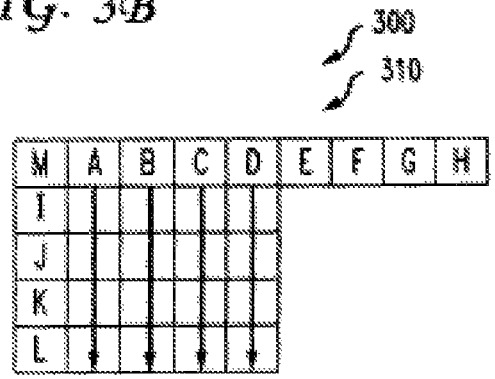
Figure 3C:
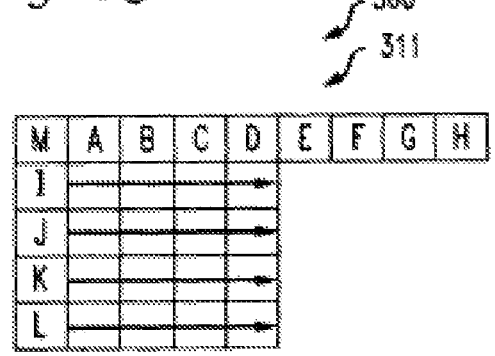
Figure 3D:
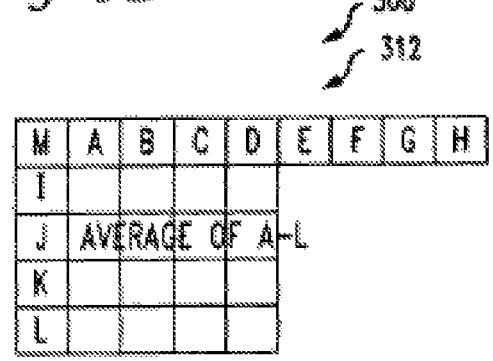
Figure 3E:
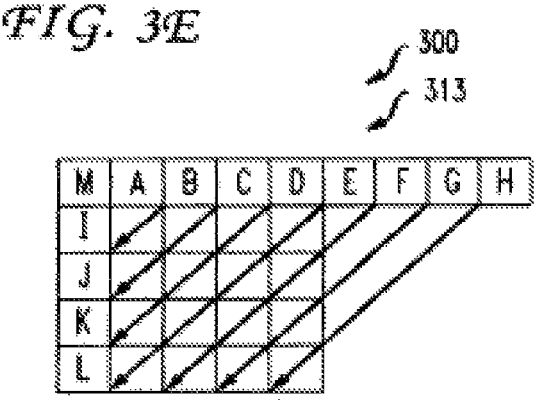
Figure 3F:
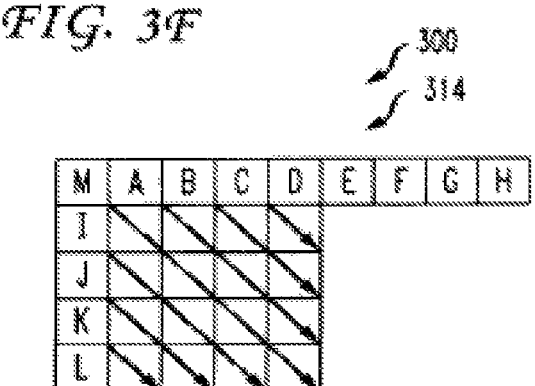
Figure 3G:
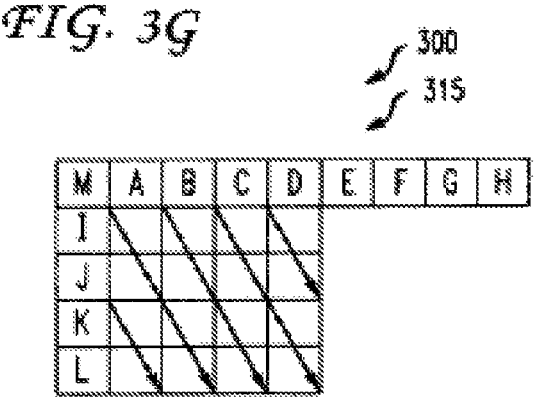
Figure 3H:
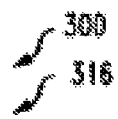
Figure 3I:
Figure 3J:
Figure 4A:
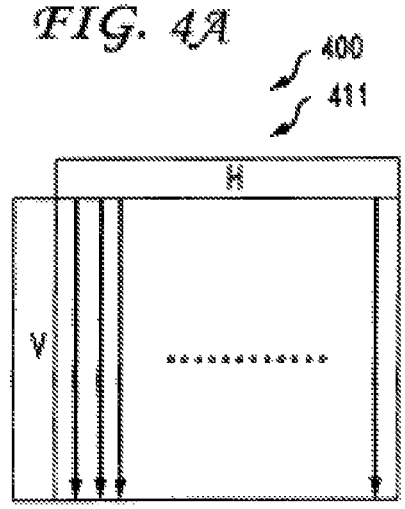
FIGS. 4A-D are diagrams respectively showing four Intra_16×16 modes corresponding to the MPEG-4 AVC Standard.
Figure 4B:
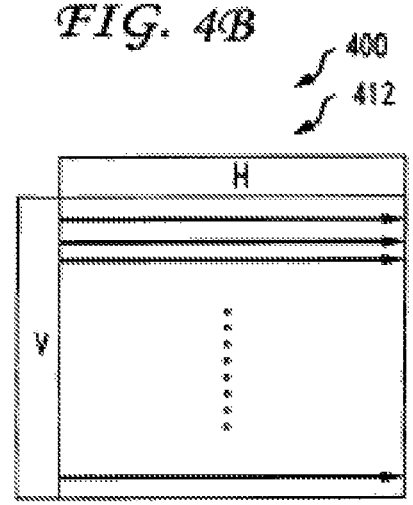
Figure 4C:
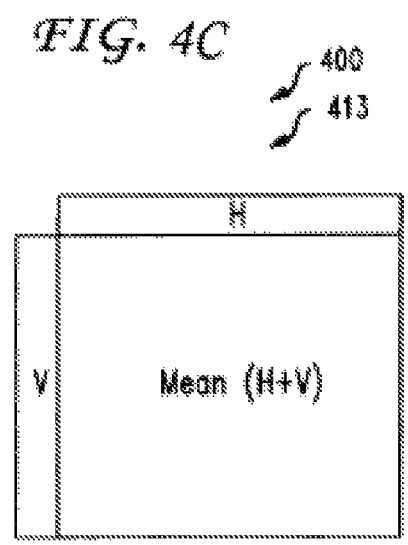
Figure 4D:
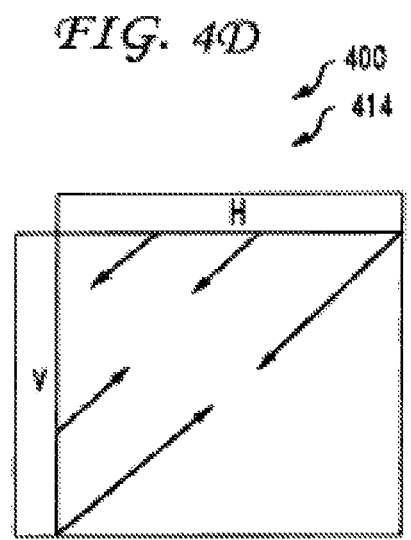

The present principles are directed to intra coding a block having pixels assigned to groups.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Turning to FIG. 5, an exemplary video encoder to which the present principles may be applied is indicated generally by the reference numeral 500. The video encoder 500 includes a frame ordering buffer 510 having an output in signal communication with a non-inverting input of a combiner 585. An output of the combiner 585 is connected in signal communication with a first input of a transformer and quantizer 525. An output of the transformer and quantizer 525 is connected in signal communication with a first input of an entropy coder 545 and a first input of an inverse transformer and inverse quantizer 550. An output of the entropy coder 545 is connected in signal communication with a first non-inverting input of a combiner 590. An output of the combiner 590 is connected in signal communication with a first input of an output buffer 535.

A first output of an encoder controller 505 is connected in signal communication with a second input of the frame ordering buffer 510, a second input of the inverse transformer and inverse quantizer 550, an input of a picture-type decision module 515, a first input of a macroblock-type (MB-type) decision module 520, a second input of an intra prediction module 560, a second input of a deblocking filter 565, a first input of a motion compensator 570, a first input of a motion estimator 575, and a second input of a reference picture buffer 580.

A second output of the encoder controller 505 is connected in signal communication with a first input of a Supplemental Enhancement Information (SEI) inserter 530, a second input of the transformer and quantizer 525, a second input of the entropy coder 545, a second input of the output buffer 535, and an input of the Sequence Parameter Set (SPS) and Picture Parameter Set (PPS) inserter 540.

An output of the SEI inserter 530 is connected in signal communication with a second non-inverting input of the combiner 590.

A first output of the picture-type decision module 515 is connected in signal communication with a third input of the frame ordering buffer 510. A second output of the picture-type decision module 515 is connected in signal communication with a second input of a macroblock-type decision module 520.

An output of the Sequence Parameter Set (SPS) and Picture Parameter Set (PPS) inserter 540 is connected in signal communication with a third non-inverting input of the combiner 590.

An output of the inverse quantizer and inverse transformer 550 is connected in signal communication with a first non-inverting input of a combiner 519. An output of the combiner 519 is connected in signal communication with a first input of the intra prediction module 560 and a first input of the deblocking filter 565. An output of the deblocking filter 565 is connected in signal communication with a first input of a reference picture buffer 580. An output of the reference picture buffer 580 is connected in signal communication with a second input of the motion estimator 575 and a third input of the motion compensator 570. A first output of the motion estimator 575 is connected in signal communication with a second input of the motion compensator 570. A second output of the motion estimator 575 is connected in signal communication with a third input of the entropy coder 545.

An output of the motion compensator 570 is connected in signal communication with a first input of a switch 597. An output of the intra prediction module 560 is connected in signal communication with a second input of the switch 597. An output of the macroblock-type decision module 520 is connected in signal communication with a third input of the switch 597. The third input of the switch 597 determines whether or not the "data" input of the switch (as compared to the control input, i.e., the third input) is to be provided by the motion compensator 570 or the intra prediction module 560. The output of the switch 597 is connected in signal communication with a second non-inverting input of the combiner 519 and an inverting input of the combiner 585.

A first input of the frame ordering buffer 510 and an input of the encoder controller 505 are available as inputs of the encoder 500, for receiving an input picture. Moreover, a second input of the Supplemental Enhancement Information (SEI) inserter 530 is available as an input of the encoder 500, for receiving metadata. An output of the output buffer 535 is available as an output of the encoder 500, for outputting a bitstream.

Figure 6:
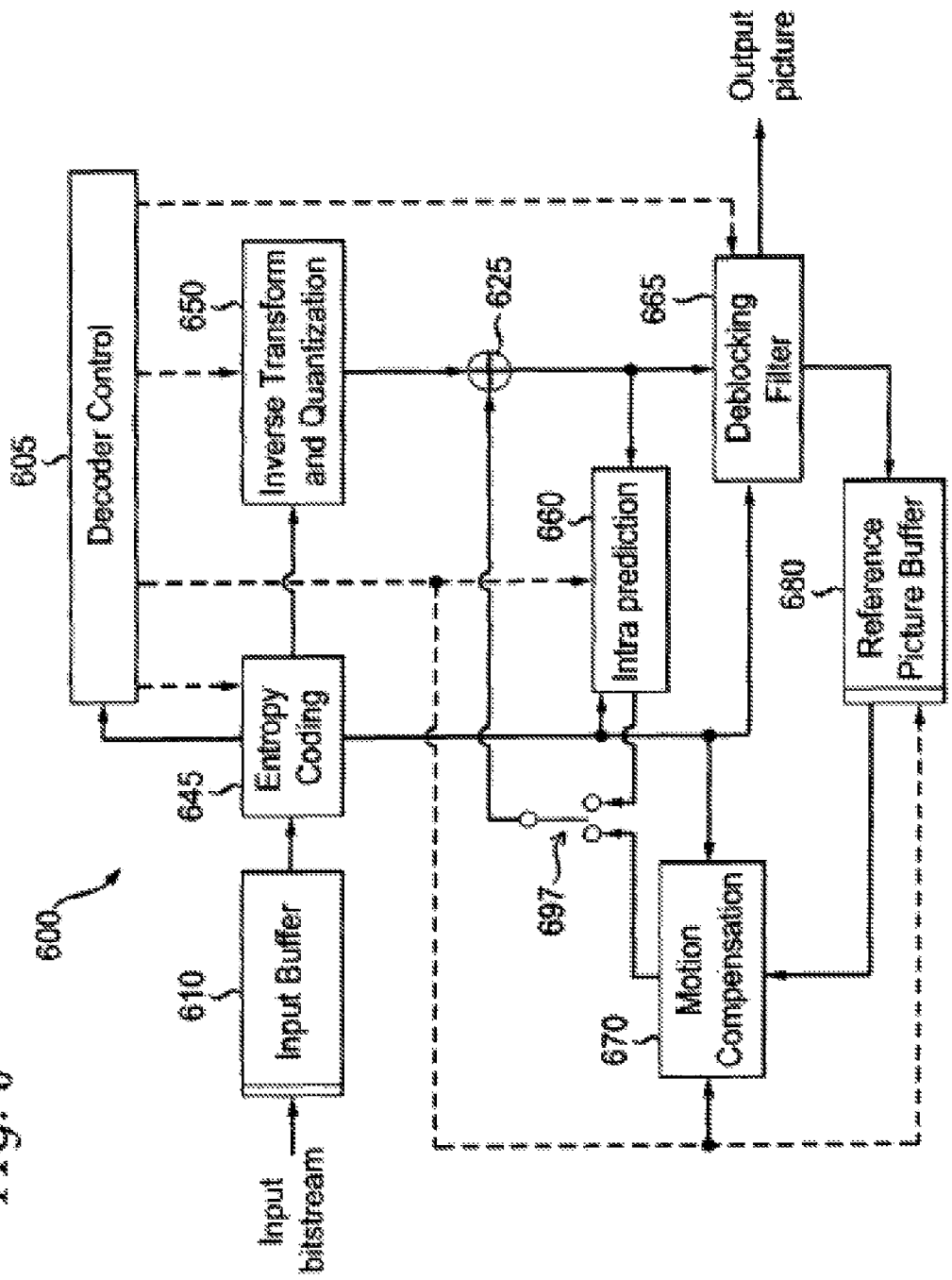
FIG. 6 is a block diagram showing an exemplary video decoder to which the present principles may be applied, in accordance with an embodiment of the present principles.

Turning to FIG. 6, an exemplary video decoder to which the present principles may be applied is indicated generally by the reference numeral 600. The video decoder 600 includes an input buffer 610 having an output connected in signal communication with a first input of an entropy decoder 645. A first output of the entropy decoder 645 is connected in signal communication with a first input of an inverse transformer and inverse quantizer 650. An output of the inverse transformer and inverse quantizer 650 is connected in signal communication with a second non-inverting input of a combiner 625. An output of the combiner 625 is connected in signal communication with a second input of a deblocking filter 665 and a first input of an intra prediction module 660. A second output of the deblocking filter 665 is connected in signal communication with a first input of a reference picture buffer 680. An output of the reference picture buffer 680 is connected in signal communication with a second input of a motion compensator 670.

A second output of the entropy decoder 645 is connected in signal communication with a third input of the motion compensator 670, a first input of the deblocking filter 665, and a third input of the intra predictor 660. A third output of the entropy decoder 645 is connected in signal communication with an input of a decoder controller 605. A first output of the decoder controller 605 is connected in signal communication with a second input of the entropy decoder 645. A second output of the decoder controller 605 is connected in signal communication with a second input of the inverse transformer and inverse quantizer 650. A third output of the decoder controller 605 is connected in signal communication with a third input of the deblocking filter 665. A fourth output of the decoder controller 605 is connected in signal communication with a second input of the intra prediction module 660, a first input of the motion compensator 670, and a second input of the reference picture buffer 680.

An output of the motion compensator 670 is connected in signal communication with a first input of a switch 697. An output of the intra prediction module 660 is connected in signal communication with a second input of the switch 697. An output of the switch 697 is connected in signal communication with a first non-inverting input of the combiner 625.

An input of the input buffer 610 is available as an input of the decoder 600, for receiving an input bitstream. A first output of the deblocking filter 665 is available as an output of the decoder 600, for outputting an output picture.

As noted above, the present principles are directed to methods and apparatus for intra coding a block having pixels assigned to groups. In an embodiment, for an intra block, we divide pixels within the block into at least two groups. One of the groups of pixels in the block is encoded. In an embodiment, this initial group being encoded may include, for example, the rightmost columns and/or the bottom rows of the block. The reconstructed pixels are then considered together with the pixels in the neighboring blocks that are already encoded to predict pixels in the second group. With a larger set of predictor pixels existing in more directions, the prediction of the second group of pixels is improved and so is the coding efficiency. In addition, we improve coding efficiency by using interpolation instead of extrapolation.

Specifically, in accordance with an embodiment of the present principles, the prediction accuracy of the second group can be improved, as the pixels serving as predictors (called predictor pixels) for the second group include reconstructed pixels of the first group, which are of shorter spatial distances from the pixels being predicted.

Division of Pixels in a Block into Groups

Figure 7:
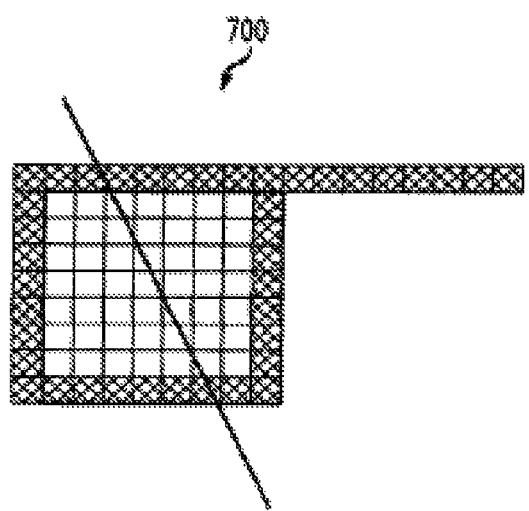
FIG. 7 is a diagram showing an exemplary grouping of pixels within a block, in accordance with an embodiment of the present principles.

The group of pixels that is first encoded is at least a portion of at least one of the columns and/or rows of the block. For example, it can be the rightmost column and/or the bottom row, as shown in FIG. 7. Turning to FIG. 7, an exemplary grouping of pixels within a block is indicated generally by the reference numeral 700. The encoder can encode the rightmost column first, or the bottom row first, or the encoder can encode both the rightmost column and the bottom row as pixels within the first group. In one embodiment, the grouping method can be implicitly derived from the neighboring pixels of the current block being encoded or based on the spatial intra prediction mode of the current block being encoded, so that the decoder can infer the grouping method in a similar manner. In another embodiment, the encoder can select one grouping method from a set of predefined grouping methods based on rate-distortion criterion and signal the selected grouping method to the decoder.

It is to be appreciated that for illustrative purposes, we have used two groups of pixels within a block for the preceding example. However, it is to be further appreciated that the present principles are not limited to the same and, thus, more than two groups of pixels within a block may also be used in accordance with the teachings of the present principles provided herein, while maintaining the spirit of the present principles.

Moreover, it is to be appreciated that for illustrative purposes relating to the aforementioned first group of pixels, we have defined the first group of pixels to include pixels in the bottom row and/or right-most row. However, it is to be further appreciated that the present principles are not limited to the same and, thus, other pixels, in addition to and/or in place of the bottom row and/or right-most row of pixels, may also be used in accordance with the teachings of the present principles provided herein, while maintaining the spirit of the present principles.

Further, it is to be appreciated that the groups of pixels within the block may be divided in any manner desired and found to be effective. That is, it is to be appreciated that the present principles are not limited to any particular block segmenting process and, thus, any block segmenting process may be used in accordance with teachings of the present principles provided herein, while maintaining the spirit of the present principles.

Encoding of the First Group

For the first group of pixels, the encoder generates the prediction based on neighboring encoded pixels using the DC/plane prediction method or some directional prediction methods, and then calculates the prediction residue. In one embodiment, the residue is coded in frequency domain, i.e., the residue is transformed, quantized and entropy coded before being sent to the decoder. In another embodiment, the residue is coded in the spatial domain, i.e., the residue is quantized and entropy coded before being sent to the decoder. In yet another embodiment, the residue is coded using adaptive prediction error coding (APEC), which performs rate distortion optimization and decides whether to code in the spatial or the frequency domain.

Encoding of the Second Group

After the first group is encoded, the encoder can use pixels in the already encoded blocks (for example, the upper and left neighboring blocks) and the pixels in the already coded first group to derive the prediction mode for the rest of the block. For example, in FIG. 7, the encoder can detect the edge across the upper block and the bottom row based on the neighboring blocks and the coded first group. Hence, the prediction direction will be along the edge direction. Interpolation will be performed with the upper/left block and the bottom row/right column instead of extrapolating from the upper block only. In this case, the mode information does not need to be sent to the decoder as the mode information can be similarly derived at the decoder. Alternatively, the encoder can perform rate-distortion optimization and select the best prediction mode for the second group and signal this to the decoder. In this case, the mode information has to be sent.

With the prediction for the second group, the encoder can encode the prediction residue for pixels in the second group in a similar method for the first group as described above, i.e., in the spatial domain or the frequency domain or using APEC. In another embodiment, the residue can be discarded and the prediction is set as a reconstruction for the second group.

Refinement of the First Group

In another embodiment, after the prediction for the second group is generated, the encoder encodes the prediction residues for both groups together, e.g., using a large transform. By doing so, there are two reconstructions for the first group. Therefore, we can apply a quantization constraint set (QCS) to the first group to obtain a more accurate reconstruction and improve the coding efficiency.

Deblocking Filter

The deblocking filter needs to be specially designed for intra blocks that are coded based on pixel grouping to improve the visual quality. In one embodiment, the deblocking filter is applied both to the block boundaries and the group boundaries within the block.

Turning to FIG. 8, an exemplary method for intra coding a block having pixels assigned to groups is indicated generally by the reference numeral 800. The method 800 includes a start block 805 that passes control to a function block 810. The function block 810 performs an encoding setup, and passes control to a loop limit block 815. The loop limit block 815 loops over each block (e.g., in a current picture being encoded), and passes control to a function block 820. The function block 820 derives the grouping method or selects the best grouping method, signals the grouping method to the decoder, and passes control to a function block 825. The function bloc 825 predicts pixels within the first group, and passes control to a function block 830. The function block 830 encodes the residue for pixels in the first group in the spatial domain or the frequency domain or using adaptive prediction error coding (APEC), and passes control to a function block 835. The function block 835 derives the prediction mode or selects and signals the best prediction mode for pixels in the second group, and passes control to a function block 840. The function block 840 predicts pixels in the second group, and passes control to a function block 845. The function block 845, for the second group, sets the prediction as the reconstruction or encodes the residue for the second group or both groups (in the spatial domain or the frequency domain or using APEC), and passes control to a function block 850. The function block 850 refines the reconstruction (e.g., using a quantization constraint set (QCS)) if the reside for pixels in the first group is encoded twice, and passes control to a loop limit block 855. The loop limit block 855 ends the loop over the blocks, and passes control to a function block 860. The function block 860 performs deblocking filtering on block boundaries and group boundaries, and passes control to an end block 899.

Turning to FIG. 9, an exemplary method for intra decoding a blocking having pixels assigned to groups is indicated generally by the reference numeral 900. The method 900 includes a start block 905 that passes control to a loop limit block 910. The loop limit block 910 begins a loop over each block (e.g., in a current picture being decoded), and passes control to a function block 915. The function block 915 derives or decodes the grouping method, and passes control to a function block 920. The function block 920 predicts pixels in the first group, and passes control to a function block 925. The function block 925 decodes the prediction residue for the pixels in the first group, and passes control to a function block 930. The function block 930 derives or decodes the prediction mode for pixels in the second group, and passes control to a function block 935. The function block 935 predicts pixels in the second group, and passes control to a function block 940. The function block 940, for pixels in the second group, sets the prediction as a reconstruction or decodes the residue for the second group or both groups, and passes control to a function block 945. The function block 945 refines the reconstruction (e.g., using QCS) if the residue for a pixel in the first group is decoded twice, and passes control to a loop limit block 950. The loop limit block 950 ends the loop over the blocks, and passes control to a function block 955. The function block 955 performs deblocking filtering on block boundaries and group boundaries, and passes control to an end block 999.

A description will now be given of some of the many attendant advantages/features of the present invention, some of which have been mentioned above. For example, one advantage/feature is an apparatus having a video encoder for encoding a block in a picture using intra prediction by dividing pixels within the block into at least a first group and a second group and encoding the pixels in the first group prior to encoding the pixels in the second group, wherein a prediction for at least one of the pixels within the second group is obtained by evaluating the pixels within the first group and the second group.

Another advantage/feature is the apparatus having the video encoder as described above, wherein a grouping method used to form the first group and the second group is responsive to neighboring pixels of the block or an intra prediction mode of the block.

Yet another advantage/feature is the apparatus having the video encoder as described above, wherein image data for the block is encoded into a resultant bitstream, and a grouping method used to form the first and the second groups of pixels is explicitly signaled in the resultant bitstream to a corresponding decoder.

Still another advantage/feature is the apparatus having the video encoder as described above, wherein the first group includes at least one of a column of pixels and a row of pixels within the block.

Moreover, another advantage/feature is the apparatus having the video encoder as described above, wherein prediction residues for the pixels in the first group are coded at least one of in a spatial domain, in a frequency domain, and using adaptive prediction error coding.

Further, another advantage/feature is the apparatus having the video encoder as described above, wherein a prediction mode for the pixels in the second group is implicitly derived at the video encoder and implicitly derivable at a corresponding video decoder responsive to neighboring blocks and reconstructed versions of the pixels in the first group.

Also, another advantage/feature is the apparatus having the video encoder as described above, wherein image data for the block is encoded into a resultant bitstream, and the video encoder selects a best prediction mode for the pixels in the second group based on at least one criterion and explicitly signals the best prediction mode in the resulting bitstream to a corresponding decoder.

Additionally, another advantage/feature is the apparatus having the video encoder as described above, wherein prediction residues for the pixels in the second group are coded at least one of in a spatial domain, in a frequency domain, and using adaptive prediction error coding Moreover, another advantage/feature is the apparatus having the video encoder as described above, wherein image data for the block is encoded into a resultant bitstream, and a prediction residue for the at least one of the pixels in the second group is withheld from inclusion in the resultant bitstream to allow a corresponding decoder to use a prediction for the at least one of the pixels as a reconstructed version of the at least one of the pixels.

Further, another advantage/feature is the apparatus having the video encoder as described above, wherein reconstructions of the pixels in the first group are refined based on more than one encoded residue for at least one of the pixels in at least one of the first group and the second group of pixels.

Also, another advantage/feature is the apparatus having the video encoder as described above, wherein the video encoder includes a deblocking filter for performing deblocking filtering on block boundaries within the picture and group boundaries within the block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding a block in a picture using intra-prediction by dividing pixels within the block into at least a first group and a second group and predicting pixels in the first group prior to encoding the pixels in the second group,
wherein the first group and the second group are responsive to a spatial intra prediction mode of the block, and
a prediction mode for at least one of the pixels within the rest of the block is obtained by using pixels within the first group and in neighboring blocks already coded,
wherein image data for the block is encoded into a resultant bitstream, and a grouping method used to form the first and the second groups of pixels is explicitly signaled in the resultant bitstream to a corresponding decoder.

2. The apparatus of claim 1, wherein a grouping method used to form the first group and the second group is responsive to neighboring pixels of the block or an intra-prediction mode of the block.

3. A method, comprising:
encoding a block in a picture using intra-prediction by dividing pixels within the block into at least a first group and a second group and predicting pixels in the first group prior to encoding the pixels in the second group, wherein the first group and the second group are responsive to a spatial intra prediction mode of the block, and a prediction mode for at least one of the pixels within the rest of the block is obtained by using pixels within the first group and in neighboring blocks already coded, wherein image data of the block is encoded into a resultant bitstream, and a grouping method used to form the first and the second groups of pixels is explicitly signaled in the resultant bitstream to a corresponding decoder.

4. The method of claim 3, wherein the grouping method used to form the first group and the second group is responsive to neighboring pixels of the block or an intra-prediction mode of the block (820).

5. An apparatus, comprising:

a video decoder for decoding a block in a picture using intra-prediction by dividing pixels within the block into at least a first group and a second group and predicting pixels in the first group prior to decoding the pixels in the second group, wherein the first group and the second group are responsive to a spatial intra prediction mode of the block, and a prediction mode for at least one of the pixels within the rest of the block is obtained by using pixels within the first group and in neighboring blocks already decoded, wherein image data for the block is decoded from a bitstream, and a grouping method used to form the first and the second groups of pixels is explicitly determined from the bitstream.

6. The apparatus of claim 5, wherein a grouping method used to form the first group and the second group is responsive to neighboring pixels of the block or an intra-prediction mode of the block.

7. A method comprising:

decoding a block in a picture using intra-prediction by dividing pixels within the block into at least a first group and a second group and predicting pixels in the first group decoding prior to decoding the pixels in the second group, wherein the first group and the second group are responsive to a spatial intra prediction mode of the block, and a prediction mode for at least one of the pixels within the rest of the block is obtained by using pixels within the first group and in neighboring blocks already decoded.

wherein image data for the block is decoded from a bitstream, and a grouping method used to form the first and the second groups of pixels is explicitly determined from the bitstream.

8. The method of claim 7, wherein a grouping method used to form the first group and the second group is responsive to neighboring pixels of the block or an intra-prediction mode of the block (915).

9. A computer readable storage media storing data comprising video data, wherein:

a block in a picture is encoded using intra-prediction by dividing pixels within the block into at least a first group and a second group and predicting pixels in the first group prior to encoding the pixels in the second group, wherein the first group and the second group are responsive to a spatial intra prediction mode of the block, and a prediction mode for at least one of the pixels within the rest of the block is obtained by using pixels within the first group and in neighboring blocks already coded, wherein image data for the block is encoded into a resultant bitstream, and a grouping method used to form the first and the second groups of pixels is explicitly signaled in the resultant bitstream.

10. The computer readable storage media of claim 9, wherein a grouping method used to form the first group and the second group is responsive to neighboring pixels of the block or an intra-prediction mode of the block.

11. The apparatus of claim 1, wherein the intra prediction comprises intra planar prediction.

12. The method of claim 3, wherein the intra prediction comprises intra planar prediction.

13. The apparatus of claim 5, wherein the intra prediction comprises intra planar prediction.

14. The method of claim 7, wherein the intra prediction comprises intra planar prediction.

15. The computer readable storage media of claim 9, wherein the intra prediction comprises intra planar prediction.

16. The method of claim 3, wherein less than all of the adjacent neighboring samples are used for the intra prediction.

* * * * *